Nov. 24, 1970    W. HABERICH ET AL    3,542,591
PURIFICATION OF SUGAR JUICE
Original Filed July 26, 1967    2 Sheets-Sheet 1

3,542,591
PURIFICATION OF SUGAR JUICE
Wilhelm Haberich and Hans-Joachim Berndt, Brunswick, Germany, assignors to Braunschweigische Maschinenbauanstalt, Brunswick, Germany
Continuation of application Ser. No. 656,199, July 26, 1967, which is a continuation-in-part of application Ser. No. 450,637, Apr. 26, 1965. This application May 14, 1969, Ser. No. 827,100
Int. Cl. B01d 15/00; C13d 3/00, 3/06
U.S. Cl. 127—51                                4 Claims

ABSTRACT OF THE DISCLOSURE

Raw sugar juice is passed sequentially through a one-step predefeco-saturation to which carbon dioxide and about 40 percent of the total lime requirement is added and in which a pH of 8.5 to 9.5 is maintained, and subsequently through main liming and first saturation stages. In this way, the same or better results are obtained than in the Braunschweig juice purification with a considerably smaller amount of lime.

---

This application is a continuation of application Ser. No. 656,199, filed July 26, 1967, now abandoned, which is a continuation-in-part of our application Ser. No. 450,637, filed Apr. 26, 1965, now abandoned.

The invention relates to an improved sugar juice purification process.

Such purification is accomplished generally by addition of lime and carbon dioxide according to various procedures where such addition has been carried out sequentially or simultaneously.

In the process using separate addition of lime and carbon dioxide, the required amount of lime is added either in a single step, or in several steps at predetermined pH values in order to obtain in the subsequent saturation (carbonatation) an improved filterable precipitate. Experience has shown that a stepwise addition of lime produces coarser grains of the precipitate than the addition in only a single step.

Also with simultaneous addition of lime and carbon dioxide (defeco-saturation), it has been observed that stepwise addition of the two reagents produces a mud of better settling and filtration properties than a one step process; with proper adjustment of the pH in subsequent steps, such defeco-saturation has given so far the best results. However, in a continuous process, a stepwise defeco-saturation requires a considerable array of reaction chambers and associated devices and specific additional operations to remove the color which in a defeco-saturation is always higher than in a process using separate liming and carbonatation. Also in juices obtained from beets damaged by frost or otherwise, the multistage defeco-saturation has generally accomplished a better purification than the separate liming and subsequent carbonatation procedure.

It has also been proposed to place a pretreatment with lime and carbon dioxide, called predefeco-saturation, in front of the conventional liming and carbonatation steps. This process is represented by the so-called "Braunschweig juice purification" developed by the assignee of this application in collaboration with F. Schneider. The results obtained with this process have been reported by F. Schneider in "The International Sugar Journal," vol. 63, pp. 10-14 (January 1961).

In the Braunschweig juice purification process, the conventional defecation and first saturation steps are preceded by two predefeco-saturation steps. By addition of lime and carbon dioxide, the pH of the first predefeco-saturation step is adjusted to 8.5–9.5. In order to obtain a sufficient reaction of the lime with the respective juice components and a firm enclosure of the colloids which at said pH of 8.5–9.5 are essentially in shrunken condition, said first predefeco-saturation step received about 40 percent of the total lime required for the entire purification operation.

In the second predefecto-saturation stage of the Braunschweig juice purification, the pH was adjusted to 10.0–10.5 by further addition of lime and carbon dioxide. Such treatment was considered imperative to shrink the colloids to their smallest volume and to stabilize the same in said state against swelling or peptization in the subsequent defecation and first saturation steps so as to have them easily separated from the juice.

Applicants have discovered that in said second predefeco-saturation step at the pH of 10–10.5, the carbon dioxide can be omitted without any harmful results on the stabilization of the colloids. It is sufficient to obtain the pH of 10–10.5 only by addition of lime.

The deviation from the Braunschweig purification process has the great advantage to make a larger percentage of the total lime available for the defecation and therewith for the increase of the alkalinity of the juice prior to the first saturation. According to the invention, only 40 percent of the lime is added to the predefeco-saturation, leaving 60 percent for the following defecation. This amount is sufficient to obtain in the defecation the alkalinity required for the decomposition of the invert sugars and to produce additionally a larger amount of carbonate in the first saturation. Such large carbonate formation in the first saturation improves the color of the juice because the carbonate formed in situ absorbs the coloring matter and because its absorbing power depends on the surface developed in the carbonate formation, i.e., on the amount of carbonate being formed.

Our novel process produces, due to the increased decomposition of the invert sugars and the better juice color, a juice of improved quality with less consumption of lime; this lower lime requirements inherently provide for considerably lower operational cost than the Braunschweig purification process.

In a modification of the invention, the total lime may be introduced into the main defecation and portions from said main defecation juice may be used for the addition of lime to the predefeco-saturation and, if desired, for a preliming step. This manner of adding the lime to the defeco-saturation has the advantage of permitting a very fine adjustment of the lime addition. A similar result is obtained when a part of the mud concentrate of the juice of the first saturation is returned into, or in front of, the predefeco-saturation.

Preferred embodiments of the invention are shown, in comparison with prior art procedures, in the accompanying diagrammatic drawings, wherein.

Figure 1:
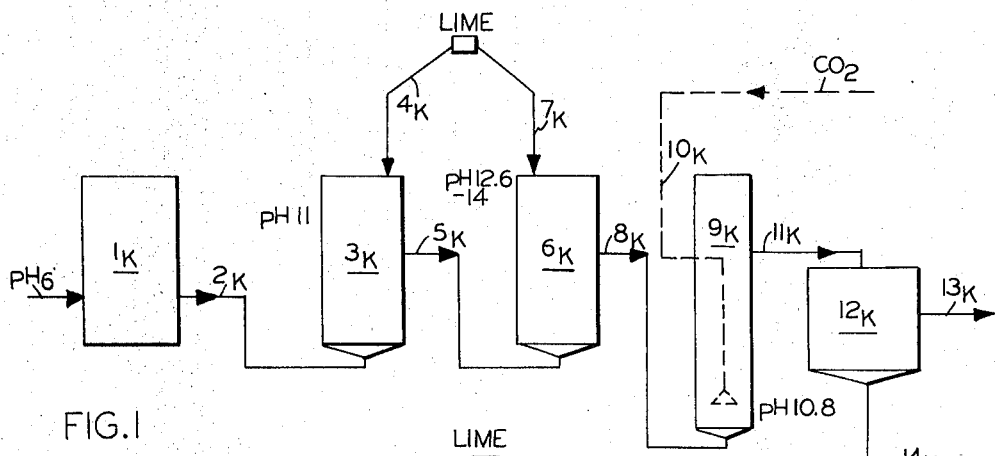
FIG. 1 is a schematic flow sheet of a conventional process.

Referring first to the conventional process shown in FIG. 1, the raw juice passes from the tank $1_K$ through line 2 into the preliming stage $3_K$. In this stage, so much of the required total lime is added through line $4_K$ that the juice leaving this stage has a pH value of about 11. The prelimed juice is passed through line $5_K$ into the main liming stage $6_K$ where the balance of lime is introduced through line $7_K$. The juice flows then through line $8_K$ into the first saturation $9_K$ in which it is treated through line $10_K$ with carbon dioxide until it has a pH value of about 11.

The saturation juice is passed through line $11_K$ into the mud separation $12_K$. The clarified juice is then passed through line $13_K$ to the second saturation for further treatment. The mud concentrate flows through line $14_K$ to the mud filtration.

Figure 2:
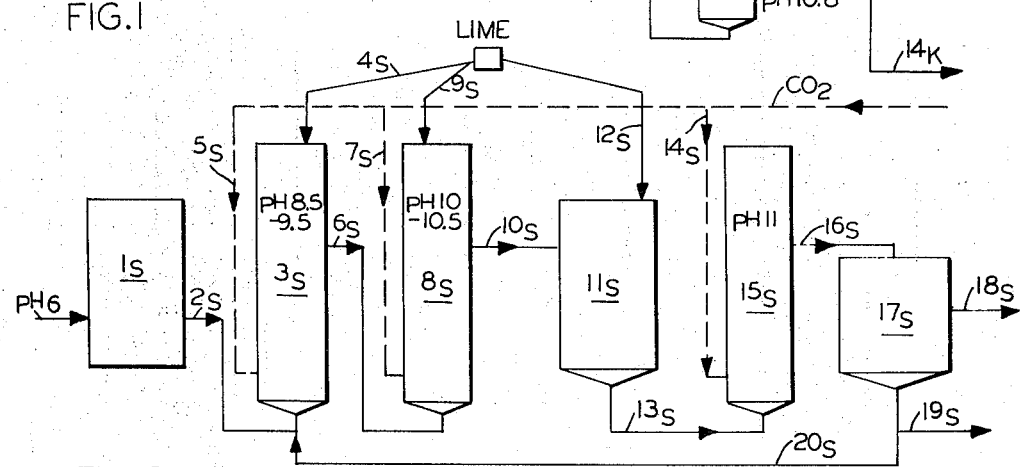
FIG. 2 is a flow sheet of the Braunschweig purification process.

In this standard process, it has been difficult to obtain optimum settling and filtration values, particularly for continuous mud separation. The Braunschweig juice purification process, as illustrated in FIG. 2, was then introduced in certain sugar factories.

In said process, raw juice having a pH of about 6 passes from the vessel $1_S$ through line $2_S$ into a first predefeco-saturation stage $3_S$; in this step, part of the required total lime is added through line $4_S$ and carbon dioxide is introduced simultaneously through line $5_S$ in such an amount that a pH value of about 8.5–9.5 obtains. The amount of lime introduced into said first predefeco-saturation stage $3_S$ is about 40% of the total lime. From the first predefeco-saturation step $3_S$, the juice passes through line $6_S$ into the second predefeco-saturation step $8_S$ to which again lime is added through line $9_S$ and carbon dioxide through line $7_S$. The amount of lime introduced through line $9_S$ is about 20 percent of the total lime while the amount of carbon dioxide introduced must be sufficient to adjust the pH to 10–10.5. From the second predefeco-saturation step, the juice passes through line $10_S$ into the defecation $11_S$ where the balance of the lime, i.e., 40% of the total lime, is added through line $12_S$. The juice travels then from the defecation $11_S$ through line $13_S$ to the first saturation $15_S$ in which it is treated with carbon dioxide through line $14_S$ until the pH is 11. From the first saturation $15_S$, the juice is passed through line $16_S$ into the mud separation $17_S$ and thence as clear juice through line $18_S$ to the after-treatment and second saturation while the mud concentrate is partly withdrawn through line $19_S$ and partly recycled through line $20_S$ to the first predefeco-saturation stage $3_S$.

Figure 3:
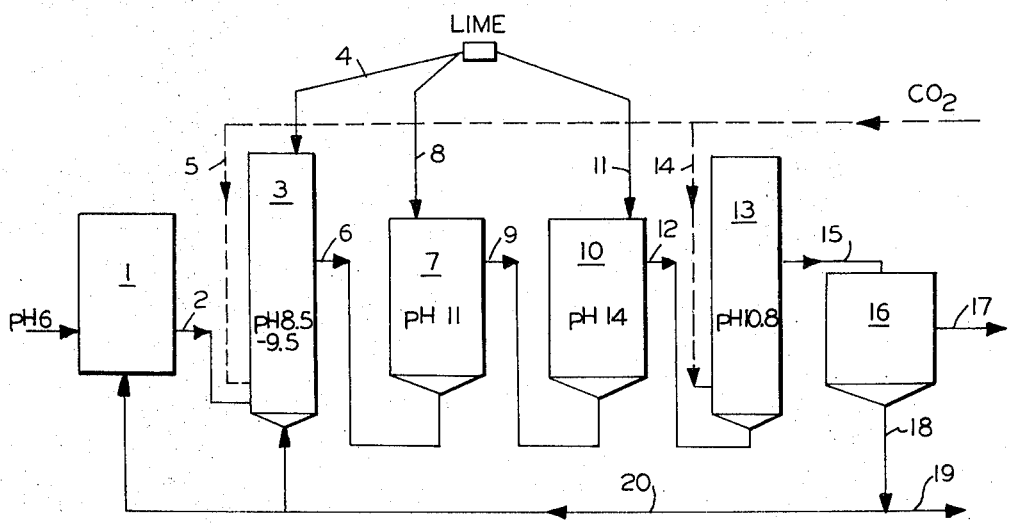
FIG. 3 is the corresponding flow sheet of the process of the invention.

In the process of the invention according to FIG. 3, the raw juice with a pH of 6 is passed from the tank 1 through line 2 into the single stage predefeco-saturation 3. There, part of the total lime requirement, i.e., about 40 percent, is introduced through line 4, and simultaneously so much carbon dioxide is added through line 5 that the juice has a pH of 8.5 to 9.5. Then the thus treated juice flows through line 6 into the conventional preliming stage 7. In said stage, the juice receives a portion of the total lime sufficient to increase the pH to about 11. From said preliming stage 7, the juice passes through line 9 into the main liming stage 10. There, the balance of the total lime is added through line 11. The juice taken from the main liming stage flows then through line 12 into the first saturation 13 and is therein treated with carbon dioxide from the line 14 while the pH is maintained at about 11. In this condition, the juice is passed through line 15 into the mud separation 16. The clear juice flows through line 17 for further treatment into the second saturation. Part of the mud concentrate from the separation 16 is returned through lines 18, 20 to the raw juice tank 1 or to the predefeco-saturation 3 while the remaining portion of the mud concentrate is passed through lines 18, 19 to the mud filtration.

Figure 4:
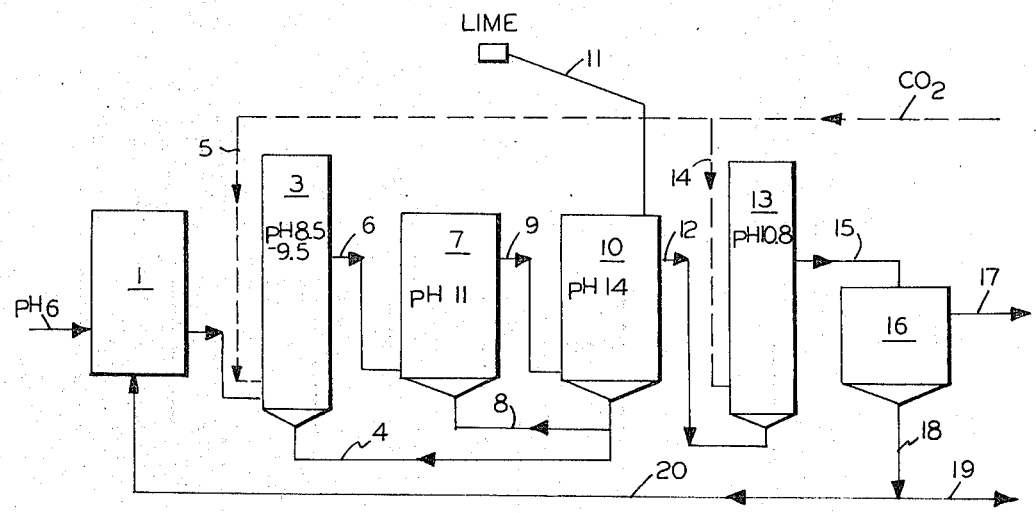
FIGS. 4 and 5 show modifications of the process of FIG. 3.

The procedure of FIG. 4 is distinguished from that of FIG. 3 only by the modification that the lime portions for the predefeco-saturation 3 through line 4 and for the first liming step through line 8 are taken from the main liming step 10 in form of limed juice.

The process according to FIGS. 3 and 4 can also be carried out in such a way that a portion of the concentrated calcium carbonate mud obtained from the first saturation 13 in the mud separation 16 is returned into, or in front of, the predefeco-saturation 3.

The settling and filtering properties as well as the quality of the juices can be so much improved by our process that the preliming step 7 can be omitted without affecting the quality as a result of such simplification. In such case, the lime portions of the eliminated step 7 are combined with the remainder of the total lime requirements and added to the main liming step 10.

Figure 5:
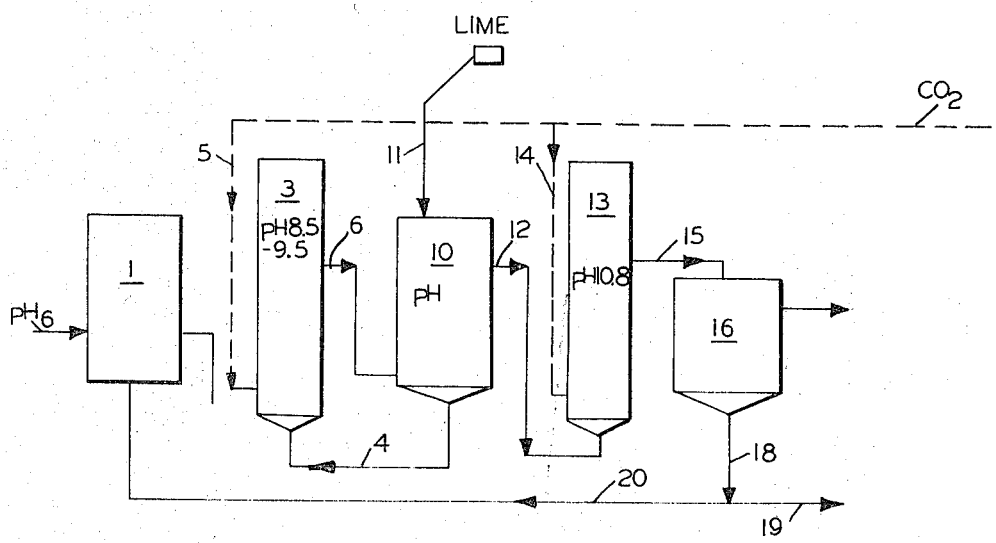

This simplified process is illustrated in FIG. 5. There is no longer a preliming step 7 but the predefeco-saturation 3 is followed immediately by the main liming 10 into which the juice is passed through line 6. In this modification, there is no extended residence time of the juice at a pH 11 but it was observed that even without such preliming and a pH of 11 considerably better results were obtained than in the known procedures. Also in this modification, the colloids are shrunken and stabilized at the pH 11 and are then precipitated in this state. As the juice introduced into the main liming stage 10 is brought to a pH of 14, it passes necessarily through a pH of 11 which appears to be sufficient to stabilize the colloids.

The savings in lime accomplished by our process over the old Braunschweig juice purification may be illustrated by the following calculation.

Let it be assumed that equal amounts of juice have to be treated and further that 60 kg. of lime are required to obtain in the defecation step the alkalinity necessary for the decomposition of the invert sugar and to present in the following saturation stage a sufficient amount of lime to obtain therein absorptive calcium carbonate particles of large surface.

In the process of the invention, 60 percent of the total lime requirements are available for this purpose; this means that the total lime requirement is 100 kg.

In the Braunschweig juice purification, only 40 percent of the total lime requirement is available for the defecation. As 60 kg. are needed for the defecation, this means that the Braunschweig juice purification requires 150 kg. for each 100 kg. of the new process, ie. that the lime consumption of the Braunschweig juice purification is 50 percent higher than that of our novel process. This higher lime requirement necessitates a correspondingly larger outlay for movement of materials, etc., inside the plant.

What is claimed is:

1. In the process of purifying raw sugar juice by a successive liming and carbonatation treatment, the improvement which consists in passing said juice prior to said treatment through a single predefeco-saturation step, adding therein to the juice carbon dioxide, and about 40 percent of the lime required for the entire purification, and maintaining the juice in said step at a pH in the range of 8.5 to 9.5.

2. The process as claimed in claim 1 comprising a preliming and a main liming step and supplying at least part of the lime for said predefeco-saturation from said main liming step.

3. The process as claimed in claim 2 wherein the lime of the preliming step is at least partially supplied in form of limed juice from the main liming step.

4. A process of purifying raw sugar juice comprising passing the raw juice sequentially through a single predefeco-saturation step, a preliming step, a main liming step, a first carbonatation step, a mud separation step, and a second carbonatation step, said predefeco-saturation step consisting in simultaneous addition of about 40 percent of the total lime and part of the carbon dioxide requirements, passing part of the mud concentrate obtained in said mud separation into said predefeco-saturation step, and maintaining the juice in said predefeco-saturation step at a pH in the range of 8.5 to 9.5.

References Cited

UNITED STATES PATENTS

| | | | |
|---|---|---|---|
| 601,305 | 3/1898 | Manoury | 127—50 X |
| 1,727,738 | 10/1929 | Van Nes | 127—48 X |
| 2,007,424 | 7/1935 | Dedek et al. | 127—48 |

(Other references on following page)

UNITED STATES PATENTS

| | | | |
|---|---|---|---|
| 2,027,422 | 1/1936 | Fortier | 127—11 X |
| 2,774,693 | 12/1956 | Brieghel-Müller | 127—50 |
| 2,977,253 | 3/1961 | Gradadam | 127—48 X |

FOREIGN PATENTS

| | | |
|---|---|---|
| 921,980 | 1/1955 | Germany. |
| 939,680 | 3/1956 | Germany. |
| 953,239 | 11/1956 | Germany. |

OTHER REFERENCES

Schneider, F.: "Experiences With Juice Purification," I.S.J., January 1961, 63:10–14.

Jaworowski, T.: "Cell-Divided Defecation Apparatus," I.S.J., January 1963, p. 23.

MORRIS O. WOLK, Primary Examiner

D. G. CONLIN, Assistant Examiner

U.S. Cl. X.R.

127—12, 48, 50, 52